United States Patent
Bernard

(10) Patent No.: US 9,269,164 B2
(45) Date of Patent: Feb. 23, 2016

(54) IMAGE INTERPOLATION METHOD WITH DECISION MIXING

(75) Inventor: Christophe Bernard, Paris (FR)

(73) Assignee: ZORAN (FRANCE) S.A., Neuilly-sur-Seine (FR)

( * ) Notice: Subject to any disclaimer, the term of this patent is extended or adjusted under 35 U.S.C. 154(b) by 220 days.

(21) Appl. No.: 13/697,938

(22) PCT Filed: Mar. 9, 2011

(86) PCT No.: PCT/EP2011/053557
§ 371 (c)(1),
(2), (4) Date: Nov. 14, 2012

(87) PCT Pub. No.: WO2011/154167
PCT Pub. Date: Dec. 15, 2011

(65) Prior Publication Data
US 2013/0069975 A1    Mar. 21, 2013

Related U.S. Application Data

(60) Provisional application No. 61/352,014, filed on Jun. 7, 2010.

(51) Int. Cl.
*G06T 11/00* (2006.01)
*G06T 3/40* (2006.01)

(52) U.S. Cl.
CPC .............. *G06T 11/00* (2013.01); *G06T 3/4007* (2013.01)

(58) Field of Classification Search
USPC .......... 345/523, 606, 660; 348/452, 459, 448; 358/525; 382/299–300
See application file for complete search history.

(56) References Cited

U.S. PATENT DOCUMENTS 5,905,822 A    5/1999  Ito et al.
8,054,380 B2   11/2011 Bruna et al.
(Continued)

FOREIGN PATENT DOCUMENTS

| EP | 0753828 A2 | 1/1997 |
| WO | 2007115583 A1 | 10/2007 |
| WO | 2010091930 A2 | 8/2010 |
| WO | 2011141196 A1 | 11/2011 |

OTHER PUBLICATIONS

International Search Report and Written Opinion of the International Searching Authority from PCT/EP2011/053557, dated May 12, 2011.
(Continued)

*Primary Examiner* — Ming Hon
*Assistant Examiner* — Phuc Doan
(74) *Attorney, Agent, or Firm* — The Marbury Law Group, PLLC

(57) ABSTRACT

The method comprises for a pixel of an output grid which is not on an input grid on which pixel values are received in an input signal: determining a loss value for each of a plurality of candidate interpolators by analyzing the pixel values of the input grid along a direction associated with the candidate interpolator; selecting at least one interpolator by minimizing the loss value; and determining an output pixel value. At least two interpolation modes are provided, including: a first mode in which one interpolator is selected and the output pixel value is determined as an interpolated value obtained by applying locally the selected interpolator to pixel values of the input grid; and a second mode in which more than one interpolator is selected and the output pixel value is determined as a weighted sum of a plurality of interpolated values obtained by applying locally the selected interpolators.

19 Claims, 3 Drawing Sheets

(56) References Cited

U.S. PATENT DOCUMENTS

| | | | |
|---|---|---|---|
| 2007/0031065 A1 | 2/2007 | Sun | |
| 2007/0229534 A1* | 10/2007 | Kim et al. | 345/606 |
| 2008/0317373 A1* | 12/2008 | Aoyama et al. | 382/269 |
| 2009/0028464 A1* | 1/2009 | Pan et al. | 382/300 |
| 2009/0278981 A1* | 11/2009 | Bruna et al. | 348/448 |
| 2011/0211125 A1* | 9/2011 | Petrides | 348/616 |

OTHER PUBLICATIONS

Atkins C. B.: "PhD Thesis—Classification-Based Methods in Optimal Image Interpolation", Purdue University, Dec. 1, 1998, pp. I-IX, 1-95.

* cited by examiner

IMAGE INTERPOLATION METHOD WITH DECISION MIXING

BACKGROUND OF THE INVENTION

The present invention relates generally to digital image processing and in particular to interpolation methods used for scaling video sequences spatially and/or in time.

Digital video is typically represented as a series of images or frames, each of which contains an array of pixels. Each pixel includes information, such as intensity and/or color information. When scaling the image frames in space, in time or both in time and space, information for new pixels is missing and values for such pixels have to be interpolated from input pixel values.

In various super-resolution image processors, e.g. as disclosed in WO 2007/115583 A1, a set of candidate directions is considered for each output pixel. Each candidate direction is associated with a candidate directional interpolator used to compute a loss value based on input pixel values in the vicinity of the output pixel. A standard decision for deriving the final pixel value consists in selecting the direction with the smallest loss value. The output pixel value is then computed using the directional interpolator associated with the selected direction.

Such a standard implementation has drawbacks.

For example, in corner cases where substantially different directions are competing with loss values of similar magnitude, there might be abrupt switches from one decision to a different one. This causes discontinuities in the output images to appear. Structure that was not present in the input images may also become apparent and be perceived by the viewer as artifacts. This kind of problem can exist in 2D (still) images or in 3D (video) sequences.

Another kind of problem encountered with standard interpolation techniques in the case of video sequences having fade-in or fade-out effects. The interpolation processor can take inconsistent decisions along the fade-in or fade-out time, and change from a decision to a different one. In this case, the shape of the interpolated image can change simply with a change of contrast, which appears strange to the viewer.

There is thus a need for interpolation methods which avoid various artifacts which can be seen with existing methods.

SUMMARY OF THE INVENTION

An image interpolation method is proposed, comprising:
receiving an input signal having pixel values on an input grid;
for a pixel of an output grid which is not located on the input grid, determining a respective loss value for each of a plurality of candidate interpolators by analyzing the pixel values of the input grid along a direction associated with the candidate interpolator;
selecting at least one interpolator of the plurality of candidate interpolators for said pixel of the output grid by minimizing the loss value; and
determining an output pixel value for said pixel of the output grid.
At least two interpolation modes are provided, including:
a first mode in which one interpolator is selected by minimizing the loss value, and the output pixel value is determined as an interpolated value obtained by applying locally the selected interpolator to pixel values of the input grid; and
a second mode in which more than one interpolator is selected by minimizing the loss value, and the output pixel value is determined as a weighted sum of a plurality of interpolated values respectively obtained by applying locally the selected interpolators to pixel values of the input grid.

A smooth decision map can thus be built to combine the best candidates using weights in the second mode, i.e. typically when the comparison of the losses does not reveal a clear-cut winner. The computation rule for defining these weights can be designed such that the decision map (or the vector of weights associated to all candidates) is a smooth function of the input image. In this way, switching is avoided as well as the associated artifacts.

The method is generic and applicable to any interpolation system which is devised to do an adaptive interpolation depending on the image contents, and arbitrates between the different candidate interpolations by associating each direction with a loss. It is typically applied to interpolation of video sequences, but may also be applied to 2D images.

In an embodiment, the sum of the plurality of interpolated values in the second mode is weighted by non-zero coefficients determined as homogenous functions of degree 0 of the pixel values of the input signal. The decision map is then invariant with respect to a contrast change in the input image, thus avoiding artifacts which otherwise may occur, for example in fade-in or fade-out video sequences.

The plurality of candidate interpolators may include a fallback interpolator having a favorable bias in the determination of the output pixel value. In particular, if the loss value determined for the fallback interpolator is minimal among the candidate interpolators for a pixel of the output grid, the fallback interpolator can be selected and the first interpolation mode is then used for this pixel of the output grid.

In an embodiment, determining the output pixel value for the pixel of the output grid in the second mode comprises:
computing a respective bias value for each pair of interpolators among the interpolators selected by minimizing the loss value; and
computing respective mixing weights for the selected interpolators as functions of the bias values, for use in the weighted sum.

The bias value for a pair of selected interpolators may be computed as a function of loss values respectively associated with the selected interpolators of the pair and of the interpolated values respectively obtained by applying locally the selected interpolators of the pair. Where the plurality of candidate interpolators includes at least one fallback interpolator and a plurality of non-fallback interpolators, the computation of bias values may be performed with the loss value associated with a selected non-fallback interpolator being as determined by analyzing the pixel values of the input grid along the direction associated with said non-fallback interpolator, while the loss value associated with the fallback interpolator is the largest one of the loss values determined by analyzing the pixel values of the input grid along the directions respectively associated with interpolators of the plurality of candidate interpolators which are not selected non-fallback interpolators.

The bias values are preferably homogenous functions of degree 0 of the pixel values of the input signal. For example, the bias value $\beta_{Y/Z}$ for a pair of selected interpolators associated with respective interpolation directions Y and Z $$\beta_{Y/Z} = \frac{L_Z - L_Y}{|J_Z - J_Y|}$$

where $L_Y$ and $L_Z$ are respective loss values associated with the selected interpolators associated with directions Y and Z, and $J_Y$ and $J_Z$ are the interpolated values respectively obtained by applying locally the selected interpolators associated with directions Y and Z. If a fallback interpolator associated with a direction F and a number M of non-fallback interpolators associated with respective directions D1, ..., DM are selected for a pixel of the output grid (M≥1), computing mixing weights for the selected interpolators may comprise computing a weight $W_{Di}$ for a non-fallback interpolator associated with a direction Di (1≤i≤M) as:

$$W_{Di} = \sigma(\beta_{Di/F}) \times \prod_{\substack{j=1 \\ j \neq i}}^{M} \tau(\beta_{Di/Dj})$$

and the weight $W_F$ for said fallback interpolator as:

$$W_F = 1 - \sum_{i=1}^{M} W_{Di},$$

where σ is an increasing function with values between 0 and 1 such that σ(β)=0 for β≤0, and τ is an increasing function with values between 0 and 1 such that τ(−β)=1−τ(β) for any value of β.

Another aspect of the invention relates to an image interpolation device, comprising:
 an input for receiving an input signal having pixel values on an input grid;
 an analyzer for determining a respective loss value for a pixel of an output grid which is not located on the input grid and for each of a plurality of candidate interpolators, by analyzing the pixel values of the input grid along a direction associated with the candidate interpolator;
 a selector for selecting at least one interpolator of the plurality of candidate interpolators for said pixel of the output grid by minimizing the loss value; and
 an interpolation unit for determining an output pixel value for said pixel of the output grid.

The interpolation unit has at least the first and second interpolation modes as mentioned above.

Yet another aspect of the invention relates to a program product comprising a computer-readable medium, having stored thereon a program comprising program instructions adapted to, when loaded and run on a processor, cause the processor to implement the steps of an image interpolation method as defined above.

Other features and advantages of the method and apparatus disclosed herein will become apparent from the following description of non-limiting embodiments, with reference to the appended drawings.

DESCRIPTION OF PREFERRED EMBODIMENTS

Figure 1:
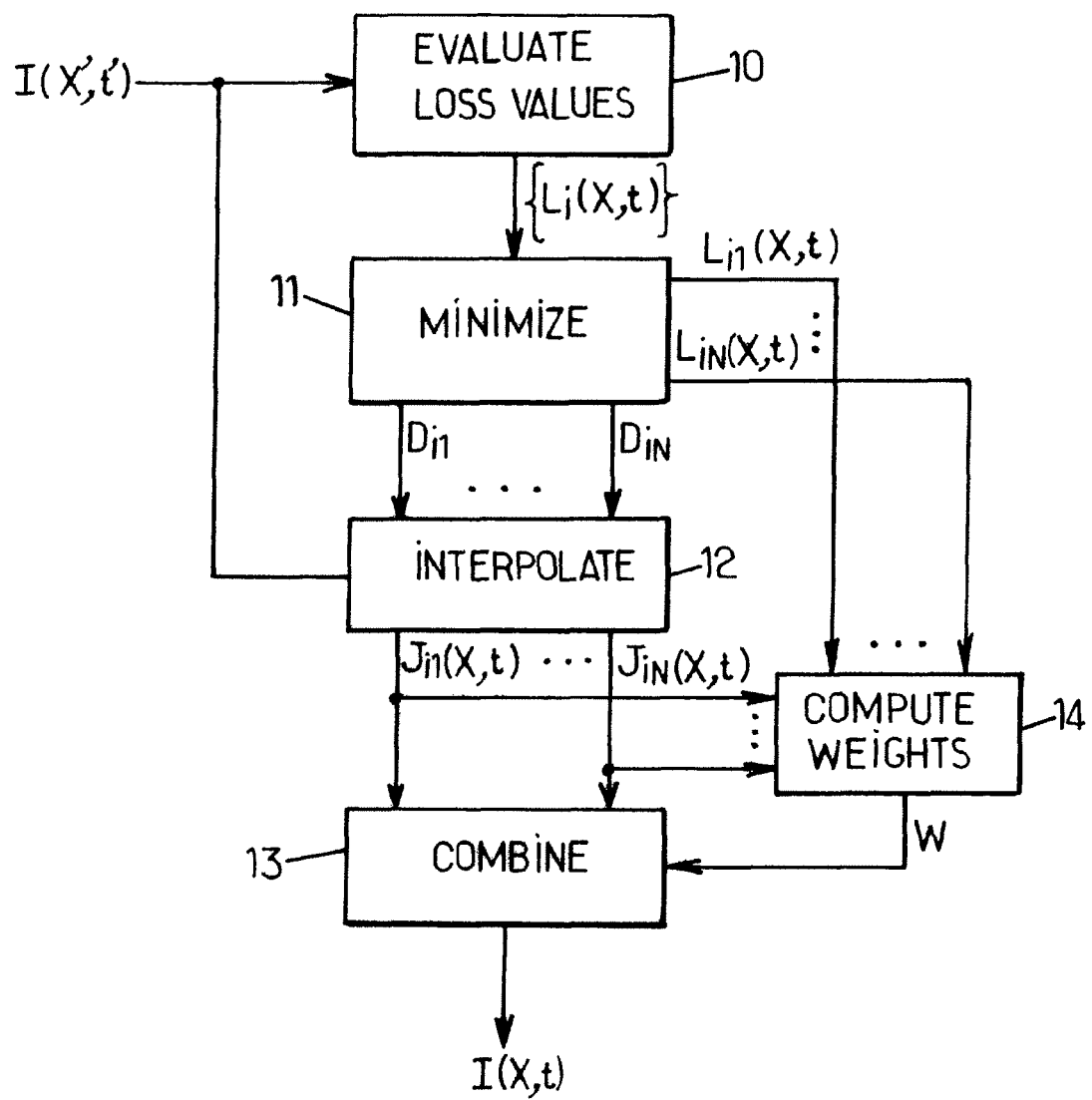
FIG. 1 is a block diagram of an interpolation device in accordance with an embodiment of the invention.

Image interpolation methods consist mainly in computing an output image array I(X, t) where (X, t) is defined over an output grid, as a scaling of an input image array I(X', t') where (X', t') is defined over an input grid. A pixel (X, t) has a location given by two spatial coordinates x, y along horizontal and vertical directions, i.e. X=(x, y), and a time index t. If only one image is considered, the time index t can be dropped. For each pixel, a pixel value is defined as a real value which can be a greyscale value or a coordinate in a color coordinate system, such as RGB, YCbCr, etc.

The scaling can be along the spatial coordinates (scaling, deinterlacing), or along time (frame rate conversion), or both.

For each output pixel (X, t) to be computed (or group thereof), a set of candidate directions $D=\{D_i\}_{i=1,...,imax}$ is considered. The set can be different for each pixel (or group thereof). To simplify the explanations below, it will be assumed that the set is always the same. Those skilled in the art can readily devise a variant where the set D is different from one pixel (X, t) to the next.

Each candidate direction $D_i$ is usually a vector of 2 or 3 coordinates, depending on whether the interpolation considered is purely spatial or in space-time. In the case disclosed in WO 2007/115583 A1, the vector is 3-dimensional. An example where the vector is 2-dimensional is disclosed in co-pending application No. PCT/EP2011/053508.

A directional interpolator, or candidate interpolator, is associated with each candidate direction $D_i$. Each directional interpolator is a different (or potentially different) function $F_i$ of the values I(X', t') of pixels (X', t') of the input image array which are neighbors of the output pixel (X, t) being considered. For example, the interpolator can simply take a form such as $J_i(X, t)=$ $$F_i(I; X, t) = \sum_{X', t'} K_i(I(X', t'), X - X', t - t')$$

where $K_i$ is a kernel function, elongated along direction $D_i$.

A loss function is also associated with each candidate direction $D_i$. It may be computed directly from input pixel values in a vicinity of the output pixel, or after computation of the interpolated value $J_i(X, t)$ yielded by the corresponding candidate interpolator $F_i$. The loss function gives a loss value $L_i(X, t)$ for each pixel (X, t) and each candidate direction $D_i$.

In practice, the common loss functions are homogenous of degree 1. This holds for the loss functions disclosed in WO 2007/115583 A1 and in co-pending application No. PCT/EP2011/053508, which can typically be used when carrying out the present method. So if the input image I(X', t') is replaced with some α+β×I(X', t'), where α and β are two constants, then the loss values $L_i(X, t)$ are replaced with β×$L_i(X, t)$. They are insensitive to offsets in the image, but scale in proportion to the increase in contrast.

Some particular directions $D_i$ (usually one but it can be more) are referred to as "fallback" directions. They correspond to "lowest risk" interpolators among the candidate interpolators. For instance, in the case of de-interlacing, this corresponds to a simple vertical interpolation, usually nicknamed "BOB" scaling. In the case of frame rate conversion, it can be interpolation along the temporal axis, i.e. assuming zero motion, using pixels from one or two nearest input frames.

Fallback interpolators correspond to an accepted baseline that provides a limited quality, but which does not produce an aberrant or ugly result even in the very worst case. The ambition when devising adaptive interpolation systems is to find regions in the output images where non-fallback interpolation can be applied. If the decision is taken correctly, the result is an increase in quality. If the decision is taken wrongly, artifacts may be visible.

Usually, there is a single fallback interpolator. In certain cases, it can be associated with several directions and several loss functions. For instance, in the case described in co-pending application No. PCT/EP2011/053508, the single fallback interpolator can be associated with two directions each associated with a respective loss function: purely horizontal and purely vertical.

A common implementation of an adaptive interpolator is, for each pixel, to select the candidate interpolator which is the most appropriate, i.e. which provides the smallest loss value. Such a strategy has the drawback, however, that in some particular contexts, it might switch abruptly from one pixel value to another one with only very slight changes to the input image. The output pixel is then a non-continuous function of the input image.

In the present method, such irregular behavior is avoided by computing an interpolated pixel in certain cases as a combination of values computed with directional interpolators selected according to the associated loss.

A block diagram of an image interpolation device according to an embodiment of the invention is shown in FIG. 1. An analyzer 10 receives the pixel values I(X', t') defined on the input grid and, for a given output pixel at (X, t) (or group of output pixels), computes the loss values $L_i(X, t)$ respectively associated with the candidate directions $D_i$ and candidate interpolators $F_i$. A selector 11 performs minimization of the loss values for the pixel (X, t) to select a number N of directions $D_{i1}, D_{i2}, \ldots, D_{iN}$. In principle, the candidate direction for which the loss value is lowest is selected. One or more other directions can be selected too according to rules discussed further below.

An interpolator 12 computes the interpolated pixel values $J_{i1}(X, t), J_{i2}(X, t), \ldots, J_{iN}(X, t)$ by applying the interpolators $F_{i1}, F_{i2}, \ldots, F_{iN}$ associated with the selected directions $D_{i1}, D_{i2}, \ldots, D_{iN}$. The interpolator 12 may not be located downstream of the selector 11 if the interpolated pixel values were already computed by applying the candidate interpolators when evaluating the loss values in the analyzer 10.

The output pixel value I(X, t) is finally obtained by a combination unit 13 as a weighted sum of the interpolated pixel values $J_{i1}(X, t), \ldots, J_{iN}(X, t)$. The weights are computed by a unit 14 as a function of the loss values $L_{i1}(X, t), \ldots, L_{iN}(X, t)$ which were minimized by the selector 11 and of the interpolated pixel values $J_{i1}(X, t), \ldots, J_{iN}(X, t)$.

The image interpolation device has a plurality of interpolation modes including a first mode where N=1 and a second mode where N>1. The interpolation mode is selected independently for each output pixel (or group of output pixels).

The first mode is selected when the selector 11 observes that, for an output pixel (X, t), one of the candidate directions is a clear winner in the minimization process. This can happen, for example, when the loss value is minimized by a fallback interpolator $F_F$. In such a case, the fallback interpolator is selected and provides directly the output pixel value I(X, t)=$J_F$(X, t). In other words, the fallback interpolator has a weight of 1 while all the other interpolators can be regarded as having a weight of 0 in the combination unit 13 for the output pixel (X, t). The first mode can also be selected when a non-fallback directional interpolator minimizes the loss value with a relatively large margin.

In a first embodiment, N=2 in the second interpolation mode. For each target pixel (X, t), a best non-fallback interpolator $F_D$ and a best fallback interpolator $F_F$ are selected, each with a respective loss value $L_D$, $L_F$, as follows:

the best non-fallback interpolator $F_D$, providing an interpolated pixel value $J_D$=$J_D$(X, t), is the directional non-fallback interpolator associated with the direction D having the lowest loss value $L_D$=$L_D$(X, t) as identified by the selector 11;

the fallback interpolator $F_F$, providing an interpolated pixel value $J_F$=$J_F$(X, t), is the fallback interpolator and the associated loss value $L_F$ is the lowest loss value for the pixel (X, t) among all the fallback and non-fallback directions different from direction D.

This provides a favorable bias to the fallback interpolator, which is associated with the best (lowest) loss value of all directions competing with D, instead of being simply associated with the best loss among all fallback directions.

A bias value between the two interpolators $F_D$ and $F_L$ is then determined by the weight computation unit 14 as follows:

$$\beta_{D/F} = \frac{L_F - L_D}{|J_F - J_D|} \quad (1)$$

The bias $\beta_{D/F}$ measures how much better the direction D is than the fallback solution at pixel (X, t). The bias function is a homogenous function of degree 0 of the input image. It is thus invariant with respect to a scaling or an offset of the image. The mixing weights can be determined from the bias value $\beta_{D/F}$ by applying a sigma profile function:

$$W_D = \sigma(\beta_{D/F}) \quad (2)$$

$$W_F = 1 - \sigma(\beta_{D/F}) \quad (3)$$

The final pixel value I(X, t) is then a mix of the values of $J_F$(X, t) and $J_D$(X, t) with the above weights:

$$I(X,t) = W_D \times J_D + W_F \times J_F \quad (4)$$

The first interpolation mode corresponds to σ=0 (selection of the fallback interpolator) or σ=1 (selection of the non-fallback interpolator). The second interpolation mode corresponds to 0<σ<1, mixing the results of the fallback and non-fallback interpolators.

Figure 2A:
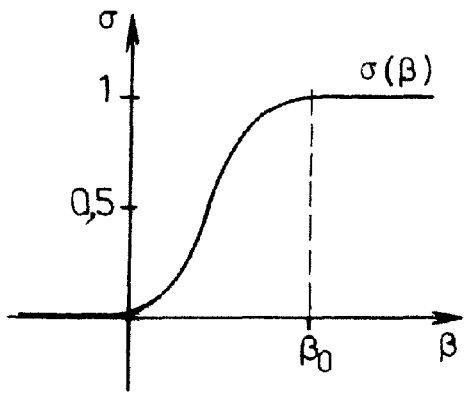
FIGS. 2A-B are graphs of σ functions usable in implementations of the interpolation method.
Figure 2B:
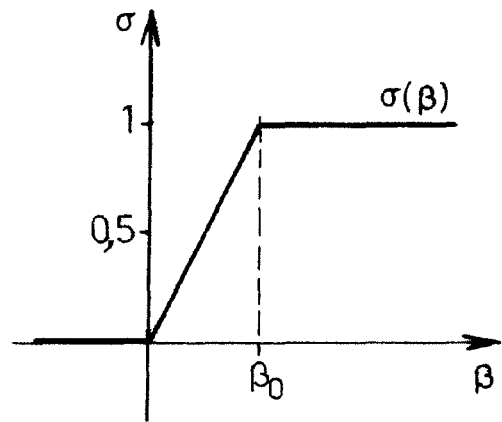

The sigma profile is a monotonous function with values ranging from 0 to 1. These functions have non-symmetric graphs. The sigma function σ(β) can be any monotonous function that takes values close or equal to 0 for negative values of β and values close or equal to 1 for large values of β. Examples are shown in FIGS. 2A and 2B, where σ(β)=1 for β larger than some positive value $\beta_0$ while σ(β)=0 when β is negative. The dissymmetry in the definition of a has an impact on the arbitration between the fallback and the non-fallback solution: the non-fallback solution, which provides a riskier candidate value, must be associated with a loss clearly more favorable than the fallback solution (i.e. the bias $\beta_{D/F}$ must be larger than some value $\beta_0$) in order for its weight to be equal to 1. In particular, if the fallback and non-fallback solutions are on par (identical losses), all the weight is devoted to the fallback solution: $W_D$=0 and $W_F$=1.

If the denominator in (1) is 0, the value of $\beta_{D/F}$ is ill-defined. This corresponds to the case where $J_F$(X, t) and $J_D$(X, t) are equal, and any mixing of these two values will yield the same final pixel value I(X, t). So in this particular case, $\beta_{D/F}$ can take any value. If one particular value is preferable for implementation purposes, it can be chosen.

This mixing decision can be generalized by considering a larger number of candidate non-fallback solutions.

In particular, a bias value $\beta_{Y/Z} = \beta_{Y/Z}(X, t)$ can be defined to compare two interpolators Y and Z retained by the selector 11 based on their respective loss values $L_Y = L_Y(X, t)$ and $L_Z = L_Z(X, t)$, and providing interpolated pixel values $J_Y = J_Y(X, t)$ and $J_Z = J_Z(X, t)$ at pixel $(X, t)$. The bias value $\beta_{Y/Z}$ measures how much interpolating along direction Y is better than interpolating along direction Z. A possible expression of the bias value $\beta_{Y/Z}$ (of which (1) is a particular case) is:

$$\beta_{Y/Z} = \frac{L_Z - L_Y}{|J_Z - J_Y|} \quad (5)$$

This expression of $\beta_{Y/Z}$ is a homogeneous function of degree 0 of the pixel values of the input signal. Indeed, each of $L_Y$, $L_Z$, $J_Y$ and $J_Z$ is a homogeneous function of degree 1 of the input signal. Therefore, during a fade-in sequence, for instance, $\beta_{Y/Z}$ remains identical.

In a second embodiment, N=2 or 3 in the second interpolation mode. Three candidate interpolators are first selected:

two best directional (non-fallback) candidate directions D1, D2 are selected as having the lowest loss values at the output pixel (X, t) among all non-fallback candidates. These are associated with respective interpolators $F_{D1}$ and $F_{D2}$ providing interpolated pixel values $J_{D1} = J_{D1}(X, t)$ and $J_{D2} = J_{D2}(X, t)$, and their loss values at (X, t) are denoted $L_{D1} = L_{D1}(X, t)$ and $L_{D2} = L_{D2}(X, t)$, with $L_{D1} \le L_{D2}$;

the fallback interpolator $F_F$ is associated with a loss $L_F$ which is the lowest loss at (X, t) among all fallback or non-fallback directions different from directions D1 and D2.

Figure 3A:
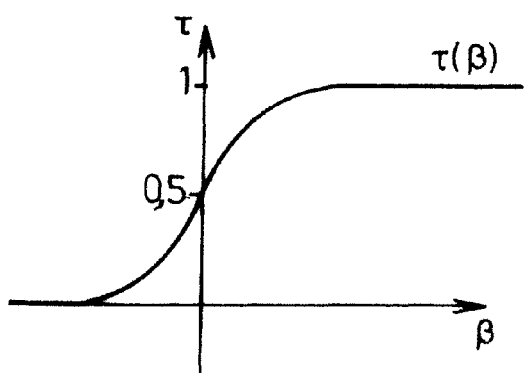
FIGS. 3A-B are graphs of τ functions usable in implementations of the interpolation method.
Figure 3B:
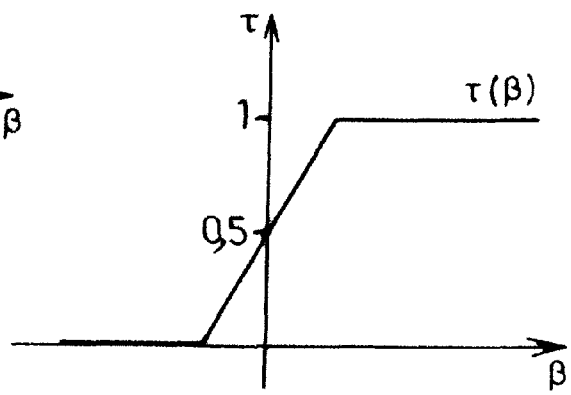

Three bias values $\beta_{D1/F}$, $\beta_{D2/F}$, $\beta_{D1/D2}$ are estimated according to (5) by the weight computation unit 14 which derives the weights:

$$W_{D1} = \sigma(\beta_{D1/F}) \times \tau(\beta_{D1/D2}) \quad (6)$$

$$W_{D2} = \sigma(\beta_{D2/F}) \times \tau(\beta_{D2/D1}) = \sigma(\beta_{D2/F}) \times [1 - \tau(\beta_{D1/D2})] \quad (7)$$

$$W_F = 1 - W_{D1} - W_{D2} \quad (8)$$

where $\tau$ is a function that takes values close or equal to 0 for large negative values of $\beta$ and values close or equal to 1 for large positive values of $\beta$, with the symmetry property: $\tau(-\beta) = 1 - \tau(\beta)$. Two examples of the function $\tau$ are shown in FIGS. 3A and 3B.

The final pixel value at (X, t) can then be obtained by the combination unit 13 as:

$$I(X,t) = W_{D1} \times J_{D1} + W_{D2} \times J_{D2} + W_F \times J_F \quad (9)$$

It is seen that if $L_F \le L_{D2}$, the direction D2 is discarded ($W_{D2} = 0$) and the second embodiment becomes similar to the first embodiment described previously, with N=1 if $L_F \le L_{D1}$ and N=2 if $L_{D1} < L_F$ (or identical to the first embodiment if the function $\tau$ is defined as $\tau(\beta) = 0$ for $\beta \le 0$ and $\tau(\beta) = 1$ for $\beta > 0$). On the other hand, if $L_F$ is larger than both $L_{D1}$ and $L_{D2}$, three interpolated pixel values are mixed (N=3).

To generalize the previous examples to potentially more interpolators, we can have N=2, 3, ... or M+1 in the second interpolation mode. A number M+1 (M≥1) of interpolators are then selected by the selector 11 for each output pixel (X, t):

the M best directional non-fallback interpolators $F_{D1}$, $F_{D2}$, ..., $F_{DM}$ respectively associated with directions D1, D2, ..., DM and loss values $L_{D1}$, $L_{D2}$, ..., $L_{DM}$ which are the M lowest loss values among all loss values obtained for non-fallback candidates, and providing interpolated pixel values $J_{D1} = J_{D1}(X, t)$, $J_{D2} = J_{D2}(X, t)$, ..., $J_{DM} = J_{DM}(X, t)$; and the best fallback interpolator $F_F$ with the lowest loss value $L_F$ among all fallback or non-fallback directions different from direction D1, D2, ..., DM.

The final pixel value for (X, t) can be defined as:

$$I(X, t) = \sum_{i=1}^{M} W_{Di} \times J_{Di} + W_F \times J_F \quad (10)$$

where:

$$W_{Di} = \sigma(\beta_{Di/F}) \times \prod_{\substack{j=1 \\ j \ne i}}^{M} \tau(\beta_{Di/Dj}) \quad (11)$$

for $1 \le i \le M$ and $$W_F = 1 - \sum_{i=1}^{M} W_{Di} \quad (12)$$

It will be appreciated that the generalization (10-12) of (2-4) or (6-9) remains an example since many other formulas can be used to compute the weights $W_{D1}$, ..., $W_{DM}$ and $W_F$.

The above-described method provides a good quality of the interpolated images. In a video interpolation device, the improvement is achieved at a marginal die cost, with little additional logic and close to no memory or memory bandwidth.

The interpolation method can be implemented using different hardware platforms. It is applicable, in particular, to process video signals in application-specific integrated circuits (ASIC) or field-programmable gate arrays (FPGA). Use of a general-purpose computer running appropriate programs is also possible.

Figure 4:
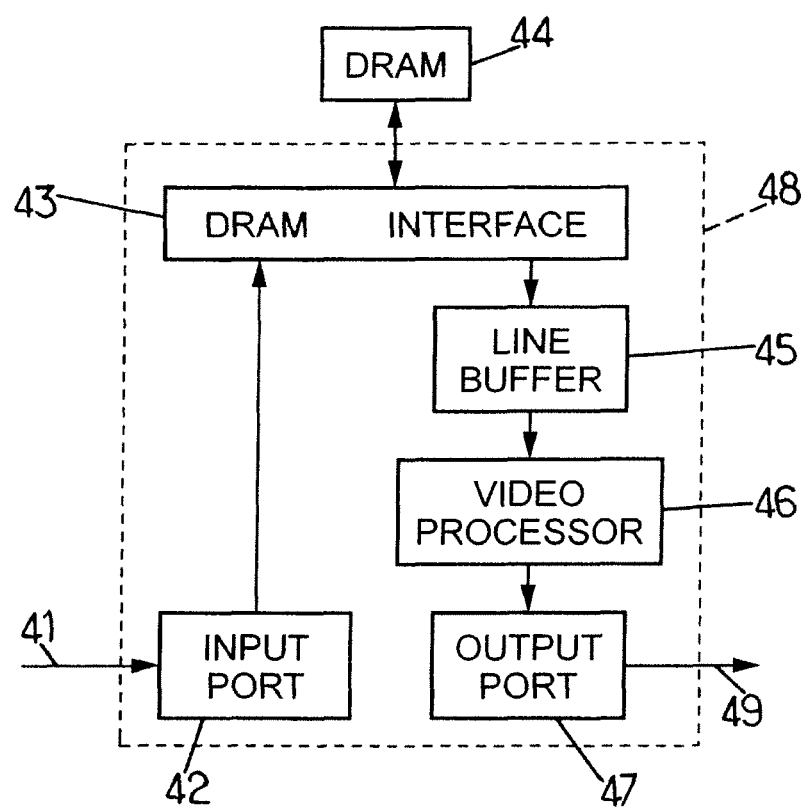
FIG. 4 is a block diagram of a video processing apparatus which may include a device according to the invention.

FIG. 4 shows the overall architecture of an exemplary processing device 48 which may be used to implement such methods when the input images are frames of a video signal. The input pixels 41 received at an input port 42 are stored into a frame buffer 44, typically implemented as one or more external dynamic random access memory (DRAM) chips, via a DRAM interface 43. Then, a video processor 46 fetches lines from the DRAM 44 through the DRAM interface 43, storing them temporarily in a line buffer 45. The output 49 of processor 46 is fed to the output port 47 to be transmitted to the next device to which the video processing device 48 is connected. All image transfers are typically done in raster order, i.e. each frame full line by full line, and each line of a frame pixel by pixel from left to right. The processor 46 runs software written in a suitable language as commonly used in the art, to implement digitally an embodiment of the above-described interpolation method. Architectures as described in WO 2010/091930 A2 can also be used.

It will be appreciated that the embodiments described above are illustrative of the invention disclosed herein and that various modifications can be made without departing from the scope as defined in the appended claims.

The invention claimed is:

1. An image interpolation method, comprising:
receiving an input signal having pixel values on an input grid;
determining a respective loss value for each of a plurality of candidate interpolators, for a pixel of an output grid which is not located on the input grid, by analyzing the pixel values of the input grid along a direction associated with the candidate interpolator;
selecting a fallback interpolator and a plurality of non-fallback interpolators from the plurality of candidate interpolators for said pixel of the output grid based on a comparison of the determined respective loss values for the plurality of candidate interpolators, wherein the fallback interpolator is the interpolator with a lowest loss value among loss values of all of the plurality of candidate interpolators with different directions than directions associated with the selected plurality of non-fallback interpolators; and
determining an output pixel value for said pixel of the output grid as a weighted sum of a plurality of interpolated values respectively obtained by applying locally the selected fallback interpolator and a plurality of non-fallback interpolators to pixel values of the input grid, wherein a sum of the plurality of interpolated values is weighted by non-zero coefficients.

2. The method of claim 1, wherein the non-zero coefficients are determined as homogenous functions of degree 0 of the pixel values of the input signal.

3. The method of claim 1, wherein the fallback interpolator has a favorable bias in the determination of the output pixel value.

4. The method of claim 3, wherein if the loss value determined for the fallback interpolator is minimal among the loss values of the plurality of candidate interpolators for said pixel of the output grid, the output pixel value for said pixel of the output grid is determined as an interpolated value obtained by applying locally only the fallback interpolator to pixel values of the input grid.

5. The method of claim 1, wherein determining the output pixel value for said pixel of the output grid comprises:
computing a respective bias value for each pair of interpolators among the selected fallback interpolator and a plurality of non-fallback interpolators; and
computing respective mixing weights for the selected interpolators as functions of the respective bias values, for use in said weighted sum.

6. The method of claim 5, wherein the bias value for a pair of selected interpolators is computed as a function of loss values respectively associated with the selected interpolators of said pair and of interpolated values respectively obtained by applying locally the pair of selected interpolators.

7. The method of claim 6, wherein the respective bias values are homogenous functions of degree 0 of the pixel values of the input signal.

8. The method of claim 7, wherein the bias value $\beta_{Y/Z}$ for a pair of selected interpolators associated with respective interpolation directions Y and Z is defined as:

$$\beta_{Y/Z} = \frac{L_Z - L_Y}{|J_Z - J_Y|}$$

where $L_Y$ and $L_Z$ are respective loss values associated with the selected interpolators associated with directions Y and Z, and $J_Y$ and $J_Z$ are the interpolated values respectively obtained by applying locally the pair of selected interpolators associated with directions Y and Z, wherein Jz and Jy are not equal.

9. The method of claim 8, wherein:
the fallback interpolator is associated with a direction F and the plurality of non-fallback interpolators is a number M of non-fallback interpolators associated with respective directions D1, ..., DM being selected for said pixel of the output grid (M≥1); and
computing mixing weights for the selected interpolators comprises computing a weight $W_{Di}$ for a non-fallback interpolator associated with a direction Di (1≤i≤M) as:

$$W_{Di} = \sigma(\beta_{Di/F}) \times \prod_{\substack{j=1 \\ j \neq i}}^{M} \tau(\beta_{Di/Dj})$$

and a weight $W_F$ for said fallback interpolator as:

$$W_F = 1 - \sum_{i=1}^{M} W_{Di},$$

where σ is an increasing function with values between 0 and 1 such that σ(β)=0 for β≤0, and τ is an increasing function with values between 0 and 1 such that τ(−β)=1−τ(β) for any value of β.

10. An image interpolation device, comprising:
an input for receiving an input signal (I(X', t')) having pixel values on an input grid;
an analyzer for determining a respective loss value for a pixel of an output grid which is not located on the input grid and for each of a plurality of candidate interpolators by analyzing the pixel values of the input grid along a direction associated with the candidate interpolator;
a selector for selecting a fallback interpolator and a plurality of non-fallback interpolators from the plurality of candidate interpolators for said pixel of the output grid based on a comparison of the determined respective loss values for the plurality of candidate interpolators, wherein the fallback interpolator is the interpolator with a lowest loss value among loss values of all of the plurality of candidate interpolators with different directions than directions associated with the selected plurality of non-fallback interpolators; and
an interpolation unit for determining an output pixel value (I(X, t)) for said pixel of the output grid as a weighted sum of a plurality of interpolated values respectively obtained by applying locally the selected fallback interpolator and a plurality of non-fallback interpolators to pixel values of the input grid, wherein a sum of the plurality of interpolated values is weighted by non-zero coefficients.

11. A computer program product comprising a non-transitory computer-readable medium, having stored thereon a program comprising program instructions adapted to, when loaded and run on a processor, cause the processor to:

receive an input signal having pixel values on an input grid;

determine a respective loss value for each of a plurality of candidate interpolators, for a pixel of an output grid which is not located on the input grid, by analyzing the pixel values of the input grid along a direction associated with the candidate interpolator;

select a fallback interpolator and a plurality of non-fallback interpolators from the plurality of candidate interpolators for said pixel of the output grid based on a comparison of the determined respective loss values for the plurality of candidate interpolators, wherein the fallback interpolator is the interpolator with a lowest loss value among loss values of all of the plurality of candidate interpolators with different directions than directions associated with the selected plurality of non-fallback interpolators; and determine an output pixel value for said pixel of the output grid as a weighted sum of a plurality of interpolated values respectively obtained by applying locally the selected fallback interpolator and a plurality of non-fallback interpolators to pixel values of the input grid, wherein a sum of the plurality of interpolated values is weighted by non-zero coefficients.

12. The image interpolation device of claim 10, wherein the non-zero coefficients are determined as homogenous functions of degree 0 of the pixel values of the input signal.

13. The image interpolation device of claim 10, wherein the fallback interpolator has a favorable bias in the determination of the output pixel value.

14. The image interpolation device of claim 13, wherein the interpolation unit is configured such that if the loss value determined for the fallback interpolator is minimal among the loss values of the plurality of candidate interpolators for said pixel of the output grid, the output pixel value for said pixel of the output grid is determined as an interpolated value obtained by applying locally only the fallback interpolator to pixel values of the input grid.

15. The image interpolation device of claim 10, wherein the interpolation unit is configured such that determining the output pixel value (I(X, t)) for said pixel of the output grid comprises:

computing a respective bias value for each pair of interpolators among the selected fallback interpolator and a plurality of non-fallback interpolators; and computing respective mixing weights for the selected interpolators as functions of the respective bias values, for use in said weighted sum.

16. The image interpolation device of claim 15, wherein the interpolation unit is configured such that the bias value for a pair of selected interpolators is computed as a function of loss values respectively associated with the selected interpolators of said pair and of interpolated values respectively obtained by applying locally the pair of selected interpolators.

17. The image interpolation device of claim 16, wherein the respective bias values are homogenous functions of degree 0 of the pixel values of the input signal.

18. The image interpolation device of claim 17, wherein the bias value $\beta_{Y/Z}$ for a pair of selected interpolators associated with respective interpolation directions Y and Z is defined as:

$$\beta_{Y/Z} = \frac{L_Z - L_Y}{|J_Z - J_Y|}$$

where $L_Y$ and $L_Z$ are respective loss values associated with the selected interpolators associated with directions Y and Z, and $J_Y$ and $J_Z$ are the interpolated values respectively obtained by applying locally the pair of selected interpolators associated with directions Y and Z, wherein Jz and Jy are not equal.

19. The image interpolation device of claim 18, wherein:

the fallback interpolator is associated with a direction F and the plurality of non-fallback interpolators is a number M of non-fallback interpolators associated with respective directions D1, . . . , DM being selected for said pixel of the output grid (M≥1); and computing mixing weights for the selected interpolators comprises computing a weight $W_{Di}$ for a non-fallback interpolator associated with a direction Di (1≤i≤M) as:

$$W_{Di} = \sigma(\beta_{Di/F}) \times \prod_{\substack{j=1 \\ j \neq i}}^{M} \tau(\beta_{Di/Dj})$$

and a weight $W_F$ for said fallback interpolator as:

$$W_F = 1 - \sum_{i=1}^{M} W_{Di},$$

where σ is an increasing function with values between 0 and 1 such that σ(β)=0 for β≤0, and τ is an increasing function with values between 0 and 1 such that τ(−β)=1−τ(β) for any value of β.

* * * * *